(12) United States Patent
Nims et al.

(10) Patent No.: US 7,927,448 B2
(45) Date of Patent: Apr. 19, 2011

(54) MICROLENS WINDOWS AND INTERPHASED IMAGES FOR PACKAGING AND PRINTING AND METHODS FOR MANUFACTURE

(76) Inventors: Jerry Nims, Atlanta, GA (US); William Karszes, Rosewell, GA (US)

( * ) Notice: Subject to any disclaimer, the term of this patent is extended or adjusted under 35 U.S.C. 154(b) by 0 days.

(21) Appl. No.: 12/292,303

(22) Filed: Nov. 17, 2008

(65) Prior Publication Data

US 2009/0071601 A1    Mar. 19, 2009

Related U.S. Application Data

(62) Division of application No. 11/730,455, filed on Apr. 2, 2007, now Pat. No. 7,796,335.

(60) Provisional application No. 60/778,108, filed on Apr. 3, 2006.

(51) Int. Cl.
*B32B 27/08* (2006.01)

(52) U.S. Cl. .................................. 156/269; 156/324

(58) Field of Classification Search ............... 156/269, 156/324; 53/396; 359/619, 620, 621, 623, 359/625, 626
See application file for complete search history.

(56) References Cited

U.S. PATENT DOCUMENTS

3,572,682 A * 3/1971 Leach et al. ............ 270/52.13
2006/0068006 A1* 3/2006 Begleiter ................ 424/464
* cited by examiner

*Primary Examiner* — Kat Wyrozebski
*Assistant Examiner* — Daniel Lee
(74) *Attorney, Agent, or Firm* — Patton Boggs LLP (57) ABSTRACT

The method for making a container includes providing a first heated conveyor having a first belt, the first belt including a plurality of heated shoes; providing a second conveyor having a second belt, the first belt and the second belt being substantially overlapping to provide a nip between at least one of the plurality of heated shoes and the second belt, the first and the second belts traveling in a common direction; placing a container on the second belt prior to the nip, the container having a opening disposed therethrough; placing a piece of lenticular material over the opening; and bonding the piece of lenticular material to the opening in the nip.

23 Claims, 9 Drawing Sheets

MICROLENS WINDOWS AND INTERPHASED IMAGES FOR PACKAGING AND PRINTING AND METHODS FOR MANUFACTURE

CROSS-REFERENCE TO RELATED APPLICATIONS

This application is a divisional of U.S. patent application Ser. No. 11/730,455, filed Apr. 2, 2007 now U.S. Pat. No. 7,796,335, which claims the benefit of U.S. Provisional Application No. 60/778,108, filed Apr. 3, 2006. The entireties of these aforementioned applications are incorporated herein by reference.

FIELD OF THE INVENTION

The field of the invention relates generally to packaging and printing. More particularly, the invention relates to microlens windows having interphased images for packaging and printing.

BACKGROUND OF THE INVENTION

Today, flat plastic windows exist for paperboard containers. Some marketers of packaged goods use these transparent windows in their packaging to enable a consumer to see the actual product and the level of the product through the window of the packaging. This is done to increase visibility of the actual product that would otherwise be unviewable due to the packaging's non-transparent material of which the packaging or container is made. For example, certain packaging for liquid, such as gable-top containers, and the like, may be marketed and displayed with see-through windows made from a transparent film. The window is located strategically on the package or container body to enable a consumer to see the materials through the window. These windows add marketing appeal to the container.

Typically, these windows are heat-sealed to the inner surface of the container prior to folding and filling it with its contents. To further this market appeal, any features added to the plastic window will further draw attention to the package. While straight printing can be used on the back of the flat plastic, the eye catching appeal is not as great as a plain window.

SUMMARY

These and other problems are overcome and additional benefits are provided by the present Microlens Windows and Interphased Images for Packaging and Printing ("microlens for packaging and printing"). In one embodiment, the microlens for packaging and printing includes a new material and utilizes different techniques to create attractive and appealing products with see-through windows. The present microlens for packaging and printing incorporates multi-dimensional printing incorporated into microlens windows that are then manufactured as part of the packaging. The multi-dimensional printing includes three-dimensional, flipping, motion, and morphing imagery or any combination thereof. The functionality of the window is maintained with the present microlens for packaging and printing by including clear see-through portions located on the microlens windows. The eye-catching appeal increases the marketability of the package.

Moreover, the present microlens for packaging and printing adds security to the package, because the total system must be employed to manufacture the same packaged and printed products. The present microlens for packaging and printing also includes graphical images that produce anti-counterfeiting characteristics for printed material. The graphical images incorporated into the microlens for packaging and printing can change as desired to provide additional security features to the packaged and printed products. The wave and particle structure of the light being transmitted to a consumer's eye by the present microlens for packaging and printing makes it more difficult for unauthorized producers to create the same packaging.

The present microlens for packaging and printing can be used for promotional pieces and for all types of packaging such as soft drink cartons, cereal boxes, dry good boxes, toothpaste boxes, etc. The present microlens for packaging and printing enable the ability to catch the eye of a consumer while adding security features to the package through the integral graphical images that may not be duplicated. Some additional exemplary microlens for packaging and printing products include perfume bottles, premium liquor boxes, and over-the-counter pharmaceutical boxes. Also, the present microlens for packaging and printing may be used for security cards, passports, ID cards, driver's licenses, stamp taxes, currency, documents, and the like. The present microlens for packaging and printing may be sealed to a container, package, or the like by heat sealing, gluing, or any other means of incorporation. In one aspect, if it is glued onto a package, the glue may be used to enable a user to peel and retain some promotional tag piece. The security aspect is retained as the tag piece identifies the product as original.

The present microlens for packaging and printing provides optical material coupled to computer interphased graphical images to produce a see-through microlens window for a container or any package benefiting from the see-through ability of the microlens window. The system is designed by controlling the imagery presented to the viewer's or consumer's eyes through light ray tracing technology. The final product produced by the system creates an eye-catching and eye-retaining microlens window that adds to the attractiveness of the product through innovative design. The system can also be used in all other forms of packaging by using the present microlens for packaging and printing to provide multi-dimensional images, symbols patterns, and optical material for labels, boxes, and containers to provide additional levels of anti-counterfeiting capability. The present system can be used for all forms of printed material from currency to passports. The physical structure of the microlens window makes the packaging impervious to alteration. The wave and particle of the light being transmitted from the microlens windows, created by the software of the system to the optical material, is transmitted to the eyes of a consumer and makes the fraudulent reproduction of the visual information in the end product very difficult. Additionally, the microlens construct is unique in and of itself as the lens surface is the heat seal layer.

In one embodiment, the present invention includes a method for making a container including providing a first heated conveyor having a first belt, the first belt including a plurality of heated shoes; providing a second conveyor having a second belt, the first belt and the second belt being substantially overlapping to provide a nip between at least one of the plurality of heated shoes and the second belt, the first and the second belts traveling in a common direction; placing a container on the second belt prior to the nip, the container having an opening disposed therethrough; placing a piece of lenticular material over the opening; and bonding the piece of lenticular material to the opening in the nip.

In one aspect, the method the placing the piece of lenticular material over the opening includes applying a hot melt to the perimeter of the opening prior to placing the piece of lenticular material on the opening. In another aspect, the placing a container on the second belt further includes placing a plurality of containers on the second belt in a continuous feed process. Preferably, the placing a piece of lenticular material further includes cutting a continuous roll of lenticular material into the pieces of lenticular material. Also, the bonding the piece of lenticular material over the opening may include sealing a microlens window into the opening of the container.

In yet another aspect, the microlens window may further include extruding a thermoplastic material to create a lenticular substrate having a plurality of lenticules. Additionally, the providing the microlens window may further include interphasing at least one graphical image onto the microlens window to provide the interphased images interposed between the plurality of lenticules and the interior of the package. Also, the providing the microlens window may further include coating a surface of the microlens window with a clear hard coating.

DETAILED DESCRIPTION OF THE DRAWINGS

Figure 1:
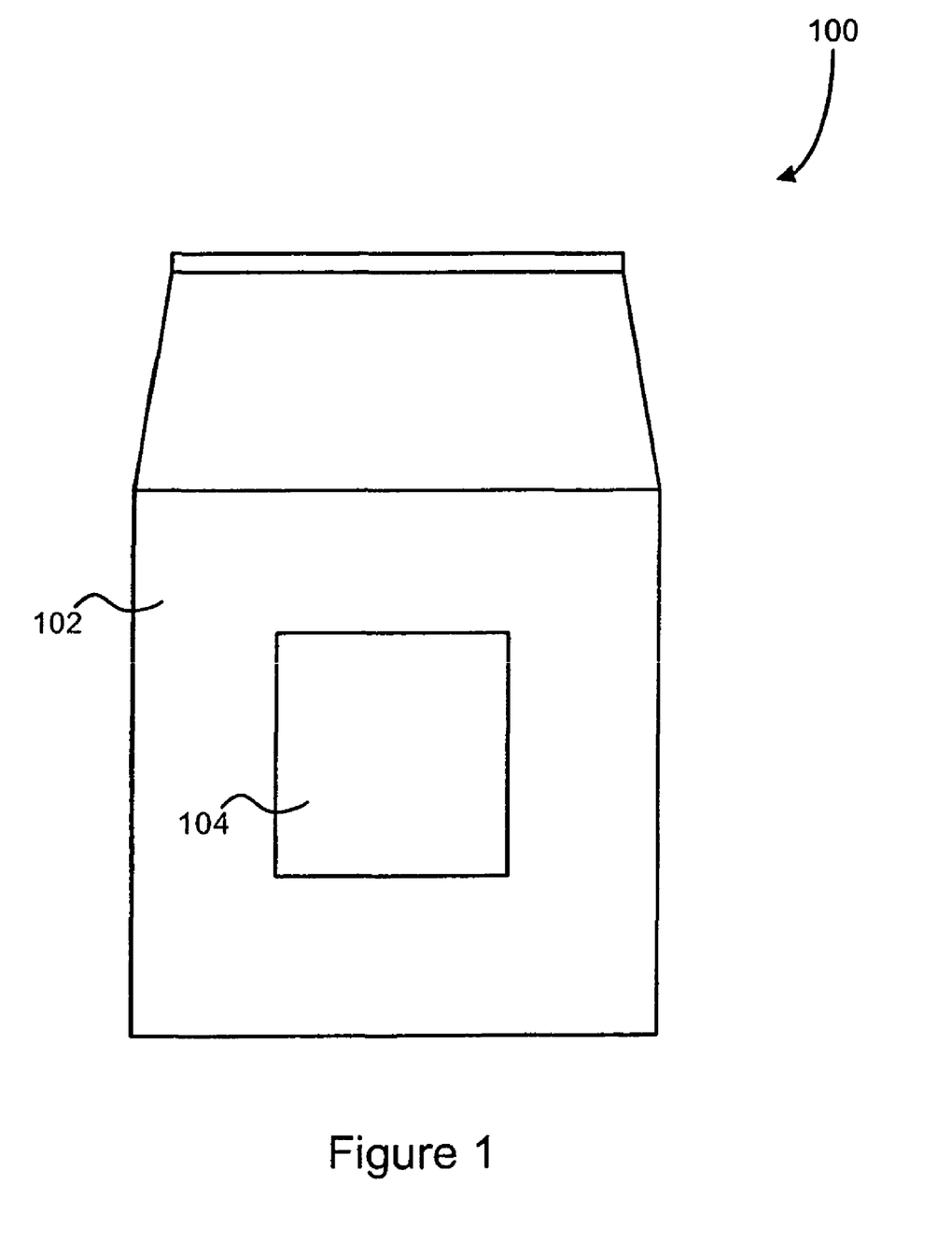
FIG. 1 illustrates a front view of a package including a microlens window according to an embodiment of the present invention.

In the drawings, like or similar elements are designated with identical reference numerals throughout the several views and figures thereof, and various depicted elements may not be drawn necessarily to scale. FIG. 1 illustrates an embodiment 100 of a package including a microlens window 104 according to an embodiment of the present invention. The package 100 includes one or more microlens windows 104. The package 100 may be a carton, box, container, or any other type of package used to contain and market a particular product, such as a liquid product. Package 100 includes a body 102 that is typically made from a transparent or non-transparent material that contains the product. The material may be any type of material suitable for containing the product within the package 100. For all materials a heat seal layer is included in the construct. The heat seal layer for the microlens material preferably is the lens layer. In one embodiment, specific types of lens materials are used where the lens surface is produced from a clear heat seal material such as EVA, EMA, LDPE, etc. Some exemplary materials are paperboard, plastic, and the like.

Figure 2:
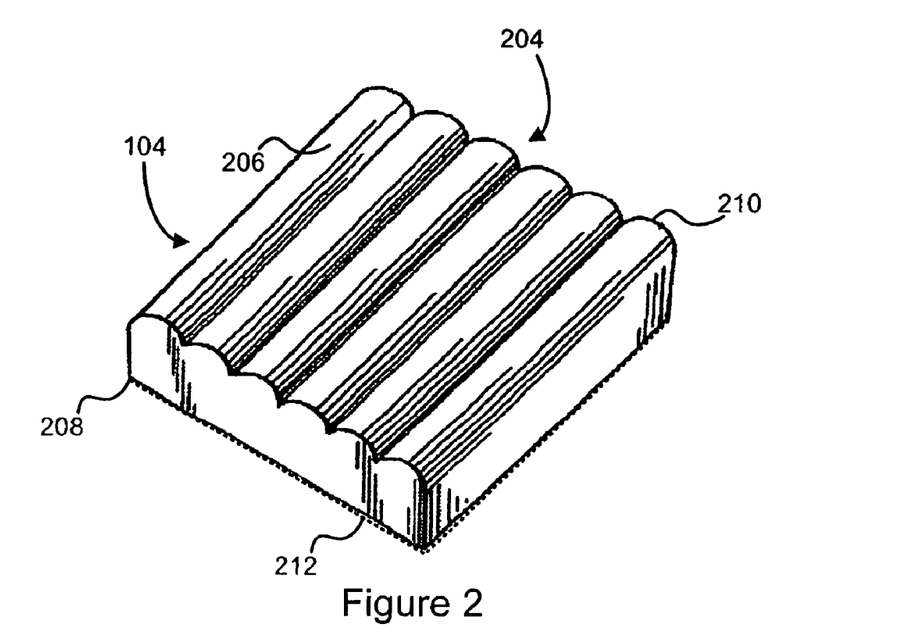
FIG. 2 illustrates a perspective view of a microlens window according to FIG. 1 according to an embodiment of the present invention.
Figure 4:
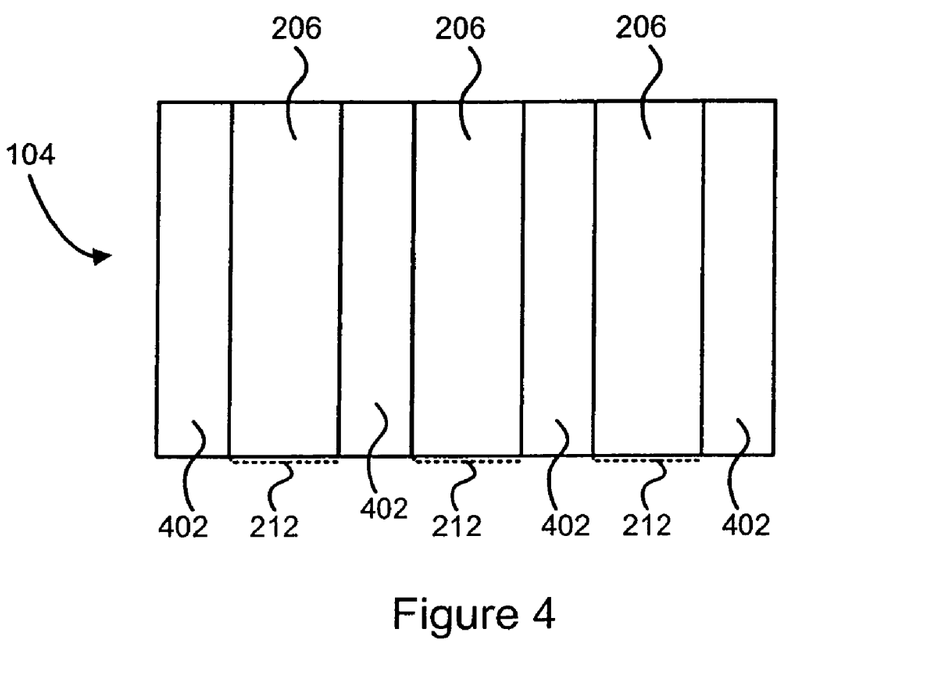
FIG. 4 illustrates a front view of the microlens window of FIG. 2 according to an embodiment of the present invention.

Turning to FIG. 2, an embodiment of the microlens window 104 is shown. The microlens window 104 includes an outer surface 210 and an inner surface 208. In this embodiment, the outer surface 210 faces the consumer for viewing purposes and the inner surface 208 contacts the contents of the package 100. As can be seen, the microlens window 104 is made up of a plurality 204 of cylindrical lenticules 206. The lenticules 206 are spaced apart from each other by flat portions as can be seen in FIG. 4. A graphical image 212, as discussed further below, is adjacent to the inner surface 208 of the microlens window 104.

Figure 3:
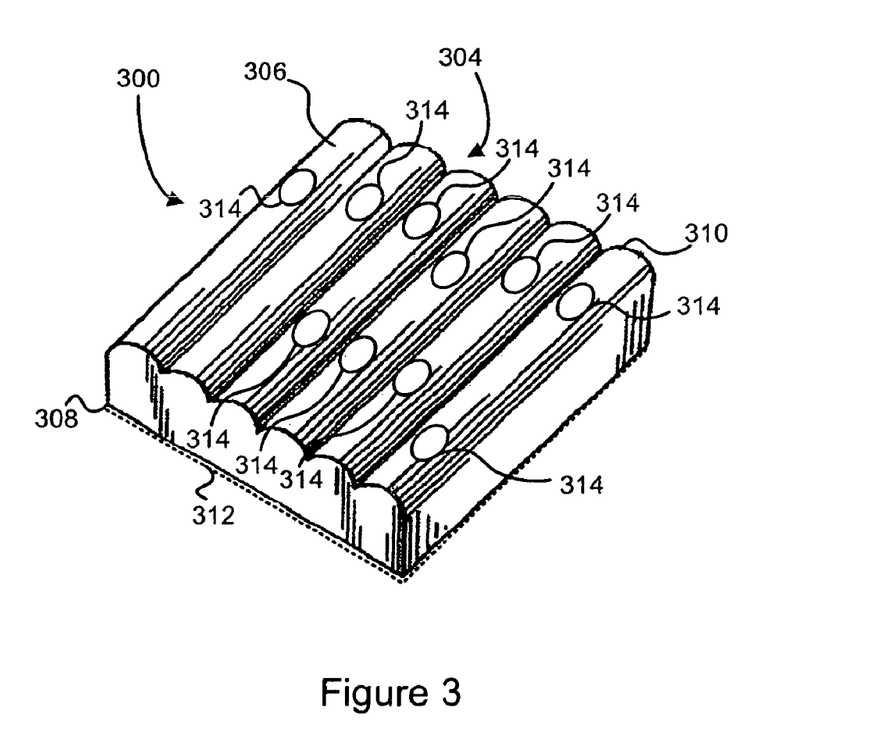
FIG. 3 illustrates a perspective view of a microlens window according to another embodiment of the present invention.

Referring to FIG. 3, another embodiment 300 of a microlens window is shown. The microlens window 300 further includes at least one or more "see-though" windows 314 that are randomly located in the interphased printed image. The designed image allows the contents of the carton to be viewed through the image from the top to the bottom of the piece in a non-continuous yet aesthetically pleasing manner.

In FIG. 4, a front view of the microlens window 104 is shown. Microlens window 104 includes lenticules 206 that overlap graphical images 212 as further described below. Adjacent to the lenticules 206 are flat portions 402 that are clear, thus enabling a consumer to view the contents of the package 100.

Figure 5:
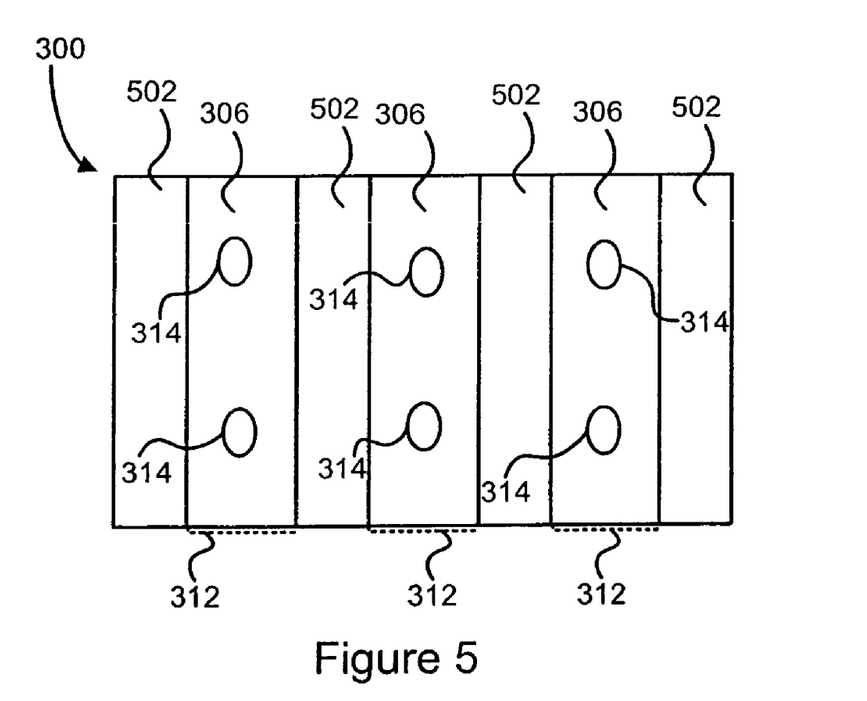
FIG. 5 illustrates a front view of a microlens window of FIG. 4 according to an embodiment of the present invention.

In FIG. 5, a front view of the microlens window 300 is shown. Microlens window 300 includes lenticules 306 that overlap graphical images 312 as further described below. In addition, adjacent to the lenticules 306 are flat portions 502 that are clear, thus enabling a consumer to view the contents of the package 100 as noted above. Moreover, microlens window 300 shows the see-through windows 314 oriented randomly in the graphical image 312 of the lenticules 306. Although only three lenticules 206 and 306 are shown in FIGS. 4 and 5, respectively, as described below, any desired number of lenticules 206 and 306 may be used.

Figure 6:
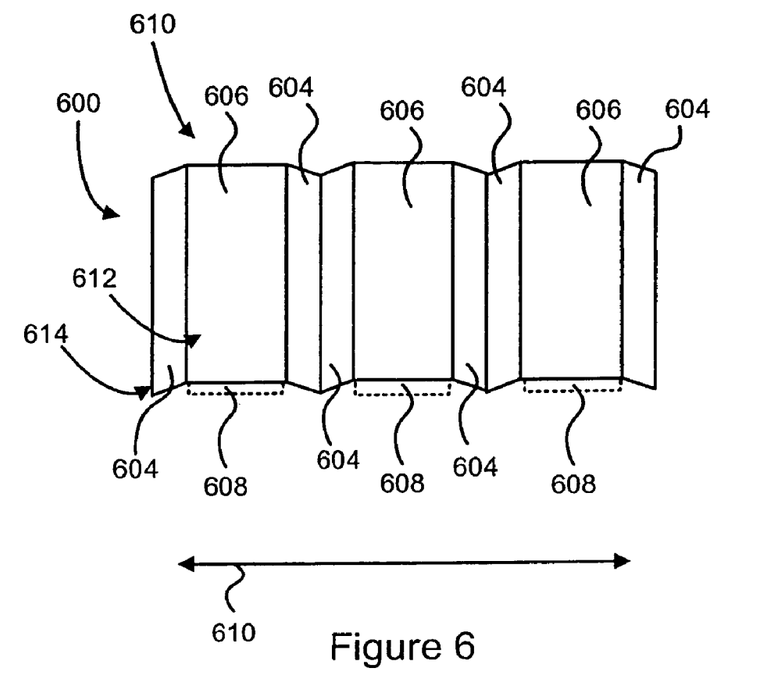
FIG. 6 illustrates a front view of the microlens window according to another embodiment of the present invention.

In FIG. 6, another embodiment 600 of a microlens window is shown. In this embodiment, microlens window 600 is used in place of or in addition to the other microlens windows described above. Microlens window 600 includes a plurality of lenticules 610, each lenticule includes a clear beveled edge 604 on each side of a flat portion 606 that overlaps the graphical images 608 adjacent to them as further described below. This provides a consumer with a graphical image that may change as their eyes move relative to the microlens window 600 in the direction of the arrow 610. Microlens window 600 includes an outer surface 612 and an inner surface 614. In this embodiment, the outer surface 612 faces the consumer for viewing purposes and the inner surface 614 contacts the contents of the package 100.

Figure 7:
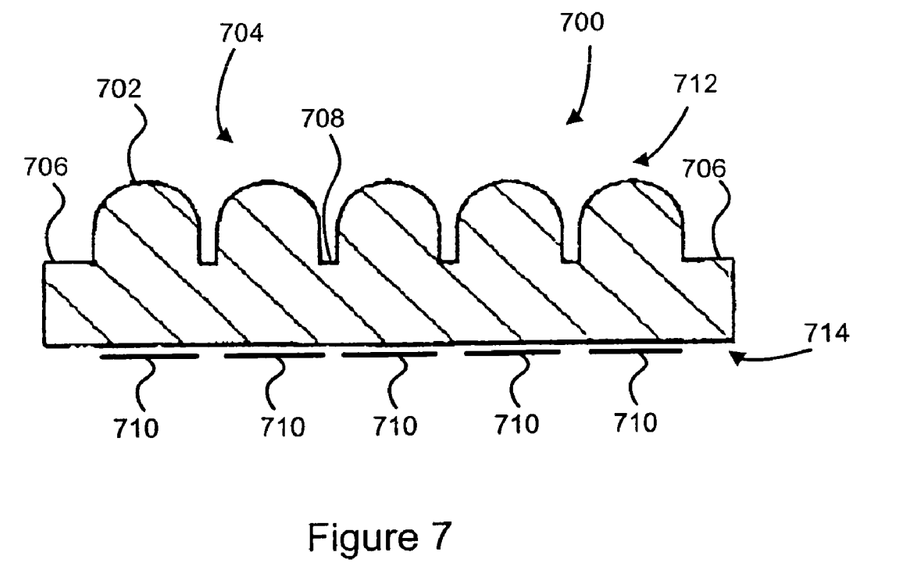
FIG. 7 illustrates a bottom view of a microlens window according to another embodiment of the present invention.

In FIG. 7, another embodiment 700 of a microlens window is shown. In this embodiment, microlens window 700 is used in place of or in addition to the other microlens windows described above. The microlens window 700 includes shoulders 706 near the edges of the microlens window 700. Preferably, the shoulders 706 extend around a portion or the entire perimeter of the microlens window 700. The shoulders 706 enable a consumer to view the contents of the package 100 around the perimeter of the microlens window 700. The microlens window 700 includes a plurality 704 of cylindrical lenticules 702. As can be seen from FIG. 7, there are graphical images 710 located adjacent to each lenticule 702. In this embodiment, there are clear flat portions 708 located between each lenticule 702. Similar to the shoulders 706, there are no graphical images located adjacent to the flat portions 708 of the microlens window 700. Flat portions 708 and shoulders 706 enable clear viewing of the contents of the package 100 while displaying the graphical images 710 through lenticules 702 to a consumer as they view the package 100.

Figure 8:
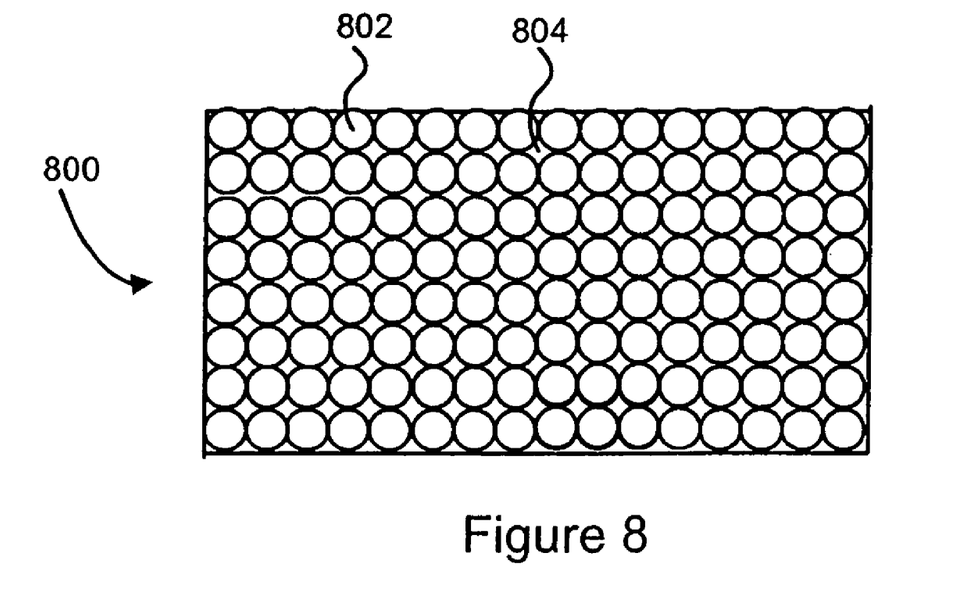
FIG. 8 illustrates a front view of a microlens window according to another embodiment of the present invention.
Figure 9:
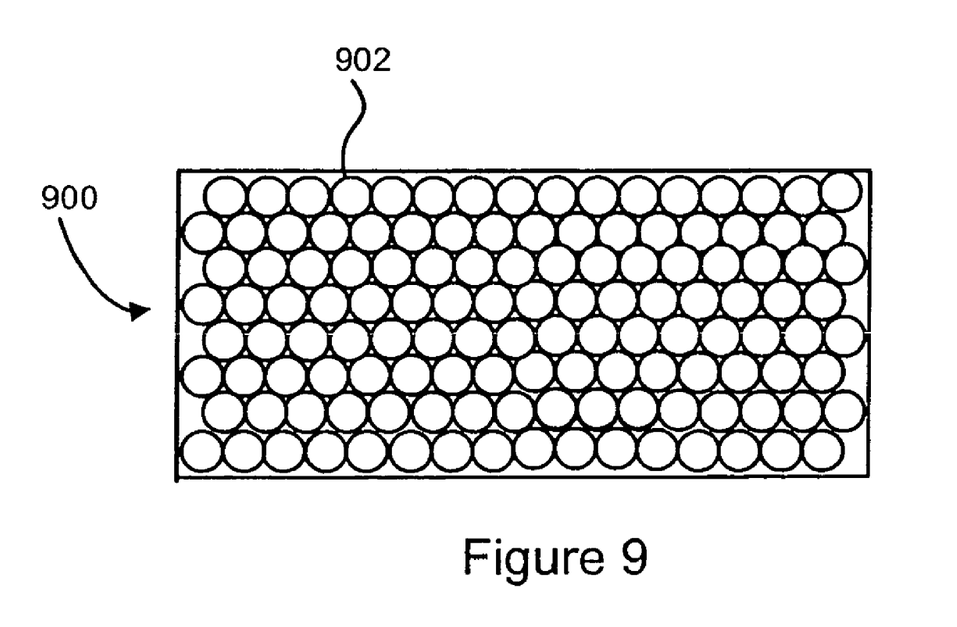
FIG. 9 illustrates a front view of a microlens window according to another embodiment of the present invention.

In FIG. 8, another embodiment 800 of a microlens window is shown. In this embodiment, microlens window 800 is used in place of or in addition to the other microlens windows described above. The microlens window 800 includes a plurality of parabolic lenticules 802 and shoulders 804 located approximately at the intersections of the parabolic lenticules 802. Preferably, graphical images are located behind each lenticule 802 similar to those described herein. In this embodiment, the shoulders 804 are clear flat portions. Preferably, there are no graphical images located behind the shoulder 804 of the microlens window 800. Shoulders 804 enable clear viewing of the contents of the package 100 while displaying the graphical images through lenticules 802 to a consumer as they view the package 100. FIG. 9 illustrates another embodiment of a microlens window 900 that does not include shoulders between the parabolic lenticules 902. Microlens windows 800 and 900 also have inner and outer surfaces similar to those described and shown herein. Random fly's eye lens will have no image behind them thus rendering them clear as see through elements.

Figure 10:
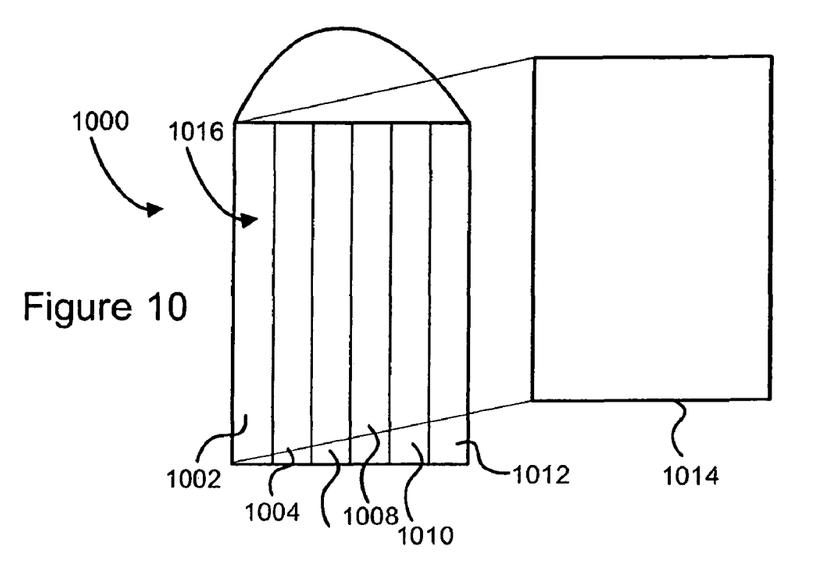
FIG. 10 illustrates a perspective back view of a lenticule showing 6 frames according to an embodiment of the present invention.

Turning to FIG. 10, an embodiment 1000 of an individual lenticule is depicted with 6 frames 1002, 1004, 1006, 1008, 1010, and 1012. The following description relates to lenticule 1000, but is applicable to any of the lenticules described herein. Also shown is a graphical image 1014 that has been interphased according to the disclosure herein that may be attached to the back surface 1016 of the lenticule 1000. As described herein, different views of a particular graphical image 1014 or graphical images are cut or sliced into segments and then interphased together to produce a finished interphased graphical image 1014 that is aligned attached to the back surface 1016 such that each segment of the interphased graphical image 1014 aligns with a particular panel 1002, 1004, 1006, 1008, 1010, and 1012. The segments are interphased in a mathematical manner, such as ray tracing, so that a desired segment is directly behind a desired panel 1002, 1004, 1006, 1008, 1010, and 1012. For three-dimensional graphical images, the graphical images are of the same scene, but slightly offset (parallax). The left and right eyes of a consumer or viewer sees the two different offset scenes and perceives the depth of the graphical image. In the case of flips, morphs, etc., a consumer or viewer's eyes view the same scene at any given angle, but at another angle will see another, thus perceiving the flip, morph, or zoom effects.

Figure 11:
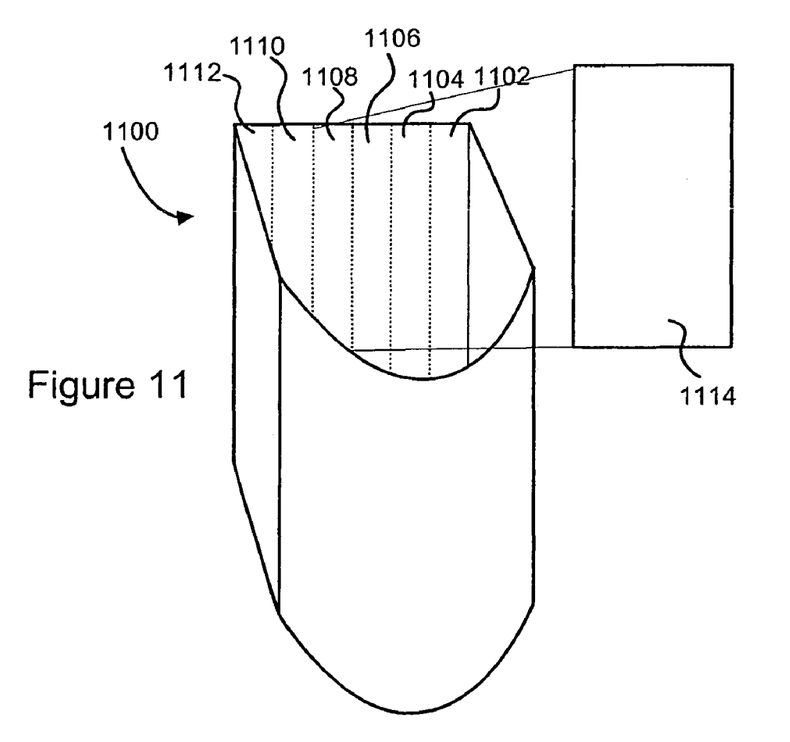
FIG. 11 illustrates a perspective front view of the lenticule of FIG. 10 according to an embodiment of the present invention.

Referring to FIG. 11, an embodiment 1100 of the individual lenticule of FIG. 10 is shown where panels 1112 and 1110 are blank with no graphical image attached to the back surface on these panels. Panels 1104, 1106, 1108 do have a graphical image 1114 attached to the back surface such as to cover panels 1104, 1106, 1108, thus producing an interphased graphical image 1114 to a viewer or consumer. In the flip, morph, or zoom effect, the blank panels 1112 and 1110 could be left blank with no graphical image 1114 attached to the back surface. In another aspect, the graphical image 1114 could be made so as to incorporate entire blank panels for affixing adjacent to panels 1112 and 1110. In addition, the lenticules 1100 may work for three-dimensional imagery as well. Depending on the desired effect, any number of panels can be left blank, thus enabling a viewer or consumer to view the contents of the package 100 through the microlens windows 104, 300, 600, 700, 800, and 900 that incorporate these lenticules 1100.

Figure 12:
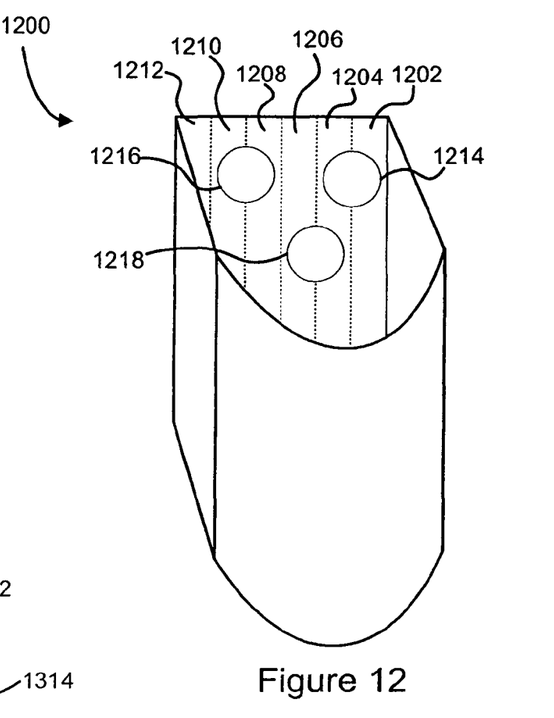
FIG. 12 illustrates a perspective front view of a lenticule showing blank spots in the graphic attached to its back surface according to an embodiment of the present invention.

In FIG. 12, an embodiment 1200 of an individual lenticule is depicted having six panels 1212 with blank spots 1214, 1216, and 1218 in the graphical image (not shown) attached to the back surface of the lenticule 1200. The blank spots 1214, 1216, and 1218 may be inserted into the graphical image after the graphical image is interphased by the system's software and hardware. Thus, the blank spots 1214 show up as bubble or circular blank spots 1214 and 1216, although any shape of blank spots may be used as desired.

Figure 13:
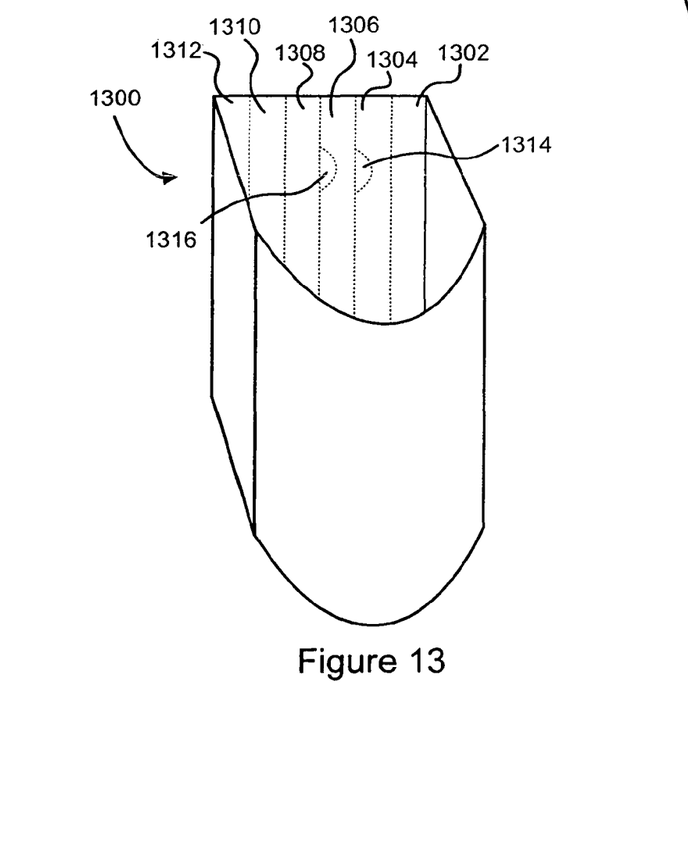
FIG. 13 illustrates a perspective front view of a lenticule showing parallaxed blank spots in the graphic attached to its back surface according to an embodiment of the present invention.

FIG. 13 depicts an embodiment 1300 of an individual lenticule that includes interphased blank spots 1314 and 1316 in the graphical image (not shown) prior to attaching to the panels 1302-1312. In this embodiment, the blank spots 1314 and 1316 are part of the graphical image prior to interphasing, thus they appear as sliced blank spots 1314 and 1316, as shown in FIG. 13.

Figures 14, 15:
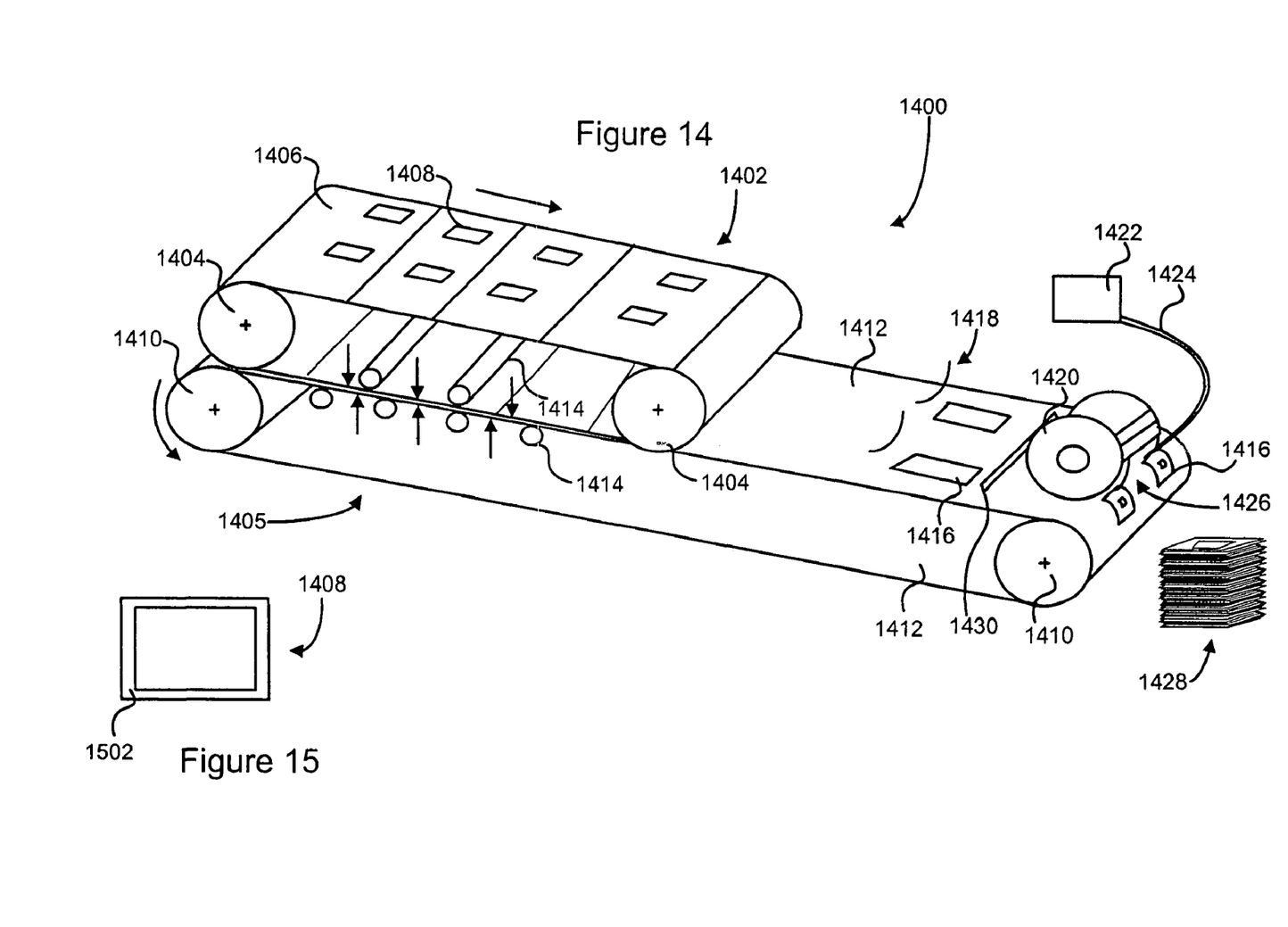
FIG. 14 illustrates a perspective view of a system for making packaging with microlens windows according to an embodiment of the present invention.
FIG. 15 illustrates a top view of a heated shoe of FIG. 14 according to the embodiment of the invention.

FIG. 14 depicts an embodiment 1400 of a system for producing package 100 including any of the microlens windows 104, 300, 600, 700, 800, and 900. System 1400 includes an upper heated tractor (conveyor) 1402 and a lower continuous conveyor 1405. FIG. 15 depicts an embodiment of a heated shoe 1408, showing an outer perimeter 1502 forming a cavity therebetween. The outer perimeter 1502 applies pressure to the outside perimeter of the hole in the package to bond the piece of lenticular material to the package. In this embodiment, one system 1400 is shown, but any number of conveyors can be used in the process. Upper heated tractor 1402 includes pulleys 1404 that transport a belt 1406 in the direction of the arrow shown adjacent to the belt 1406. The belt 1406 includes several heated shoes 1408 that are located on outer surface of the belt 1406 and move along in the same direction as the belt 1406. The lower continuous conveyor 1405 includes pulleys 1410 that transport a belt 1412 in the direction as shown by the arrow located at the end of pulley 1410.

A stack of cartons 1428 feeds individual folded cartons 1416 onto belt 1412 that then are transported under cutting station 1430 where a lenticular piece is cut from a roll of lenticular material 1426 as described herein. The cut lenticular pieces are indexed, one to a carton 1416. In one embodiment, the cut pieces of lenticular material are glued to an opening (hole) in the carton 1416 by applying a hot glue from a hot melt applicator 1422 via pipe 1424 onto the carton 1416 prior to the piece of lenticular material being placed on the carton 1416. In another embodiment, if the cut piece of lenticular material is being applied by hot lamination, then no hot melt is used. Hold down bars 1418 hold the pieces in alignment until the cut piece of lenticular material and the carton 1416 enter the nip (between upper heated tractor 1402 and lower continuous conveyor 1405) where the heated shoe 1408 comes in contact with the two pieces. The speeds of the upper heated tractor 1402 and lower continuous conveyor 1405 are matched so the heated shoe aligns to the outer edges of the microlens window and the hole in the carton 1416. The two pieces are transported further along the upper heated tractor 1402 and lower continuous conveyor 1405 while constant pressure is exerted upwardly and downwardly by rollers 1414 as shown by the arrows. This pressure and heat bonds the lenticular material to form a container (package) with a microlens window and the package exits the end of the system 1400. In one embodiment, the belt velocity is approximately 80 feet per minute with five of such systems 1400. In this embodiment, the heated shoe 1408 is heated to approximately 220° F. In this embodiment, heat is applied to the heated shoes 1408 by a heater, such as an electric heater located in each heated shoe 1408. Electricity is provided to the heated shoes 1408 by a commentator system in the upper heated tractor 1402. This results in approximately 400 packages per minute being bonded.

The opacity of the microlens windows 104, 300, 600, 700, 800, and 900 may be controlled by the white backing printed on the back of the aforementioned interphased images composed in the graphical images 212, 312, 608, and 710. Preferably, all shoulders and flat portions should be clear or transparent. Nevertheless, if it is desired to simply have the ability to easily display the level of the contents of the package 100, then the density of the white backing material can be designed to allow the density of the material to create a darker portion in the microlens window.

In one embodiment, the microlens windows 104, 300, 600, 700, 800, and 900 have a lens count of between 50 and 4,000 lens per inch ("LPI"). Preferably, the microlens windows 104, 300, 600, 700, 800, and 900 are parabolic, spherical, aspherical, or cylindrical.

Preferably, the material of the microlens windows 104, 300, 600, 700, 800, and 900 is an extrusion lenticular-coated substrate, such as biaxial oriented polyester, (OPET), or amorphous polyester (APET), or any other clear stable plastic film. The lenticular-coated substrate is either primed or unprimed and then coated with a heat sealable polymer, such as EMA, EVA, EBA, PP plus Clarifier, PE, or any other clear heat-sealable resin. During the extrusion coating process the film has microlenses embossed into the surface creating a micro-optical lens array.

The material of the microlens window 104, 300, 600, 700, 800, and 900 is preferably dependent on the heat sealing temperatures and residence time in the process for adding the microlens window 104, 300, 600, 700, 800, and 900 to the body 102 of the package 100. Some additional considerations when choosing the material of the microlens window 104, 300, 600, 700, 800, and 900 include: its approval for use with the contact of food, its non-blocking ability (non-sticking under normal roll formation during extrusion coating), its non-sticking during normal handling conditions (does not collect dust and is hard to the touch when handled by the consumer), its resistance to puncture, its stability in various environmental conditions (ambient, refrigerated, or heated), and its durability to pass through all normal form fill and seal machinery creating the finished package without degradation and/or delaminating.

The graphical images 212, 312, 406, 506, 608, and 710 are special computer generated graphical images that are sliced up digital images and then recombined into interphased digital masters. The algorithm slices up the images to match the spacing of the overlying lenticules of each microlens windows. The combination of combined images and microlens windows are designed to project to the human eye information that will make the image appear three-dimensional, morphed, zoomed, or any combination thereof. Inter-dispersed within the digital slices are clear slices with no printing. These clear areas are designed so when the viewer's eye hit the appropriate zones(s) the contents of the packaging, carton, box, etc can be viewed through the microlens window 104, 300, 600, 700, 800, and 900.

Graphical images 212, 312, 406, 506, 608, and 710 are shown adjacent to the inner side of the microlens windows 104, 300, 600, 700, 800, and 900. Adhesives may be used to connect the graphical images 212, 312, 406, 506, 608, and 710 to the microlens windows 104, 300, 600, 700, 800, and 900.

In yet a further aspect of the present invention, security cards, documents, etc. may utilize the microlens windows 104, 300, 600, 700, 800, and 900 to place images and visual information at different optical levels in the material used. This placement can be from one level to 10,000 times 100 levels. The material for security cards, etc., can be used as a platform to include covert features to go along with overt anti-counterfeiting features included. Some exemplary covert features include: taggants, digital watermarks, smart chips, bar codes, magnetic strips, and all other machine-readable technologies.

The plastic substrate films suitable for use in this invention include any clear plastic film, particularly any optically clear film. The particular film used depends, in large part, upon characteristics, such as strength, curl, thermostability, lifetime or low cost, that are desired for the end application of the lenticular-coated substrate. For instance, biaxially oriented films typically give good mechanical stability but are relatively expensive while non-oriented films give less strength but are usually considerably less costly. Typical examples of suitable plastic substrate films include but are not limited to biaxially oriented polyester film, biaxially oriented polypropylene film, non-oriented polypropylene film and non-oriented polyethylene terephthalate film. Coated or pretreated plastic films, such as MELINEX 504® (ICI, Wilmington, Del.) are useful to control the degree of adhesion between the substrate film and the adhesion layer for sealing to the package 100.

The thermoplastic lenticular resins suitable for use in this invention include any clear polymer that can be extruded. The lenticular resin used to manufacture a particular lenticular-coated substrate is selected primarily based upon the end application of the lenticular-coated substrate and the resin's ease of processing, mar resistance, clarity, and cost. As with the adhesion resin, the lenticular resin must be compatible with the selected adhesion resin from a coextrusion point of view; the rheology of these two resins must match so as to enable the two resins to flow together with little or no shear. Typical examples of lenticular resins include but are not limited to polypropylene, polycarbonate, polyethylene, polystyrene, polyvinyl chloride, and mixtures containing these polymers. Balancing layer resins suitable for use in this invention include those resins specified above for lenticular resins. Subbing resins and/or films are any clear uniform substance which meet the end use application, such as ink, gel emulsion or adhesive receptability.

Additionally, a pretreated substrate film can be used in which the pretreatment inhibit bonding of the substrate layer to the tie layer to produce a strippable lenticular (or nonlenticular) product. For instance, MELINIX 504®, which is a plastic film that has been primed for solvent ink acceptance on the upper side, has been found to inhibit bonding of the substrate layer to the tie or adhesion layer. Suitable tie resins used in combination with this film include ethylene methyl ethyl acrylate. Furthermore, exposure of the upper side of the pretreated substrate film, such as MELINEX 504®, to corona treatment prior to coextrusion onto the substrate can be used to control the force of adhesion between the substrate layer and the tie layer. For example, the force of adhesion between the substrate layer (MELINEX 504®) and the tie layer (ethylene methyl ethyl acrylate) varied from about 125 g/in to about 250 g/in as the MELINEX 504® was exposed to 0 kW to 2.5 kW of corona treatment, respectively. Above 2.5 kW, the force of adhesion decreased and leveled off at about 200 g/in.

In another embodiment of the instant invention, the lenticular-coated substrate is further processed to produce a superior quality three-dimensional image. In order to manufacture quality three-dimensional imagery, registration of the print pattern to the lenticular pattern is necessary. It has now been found that exact registration of the print pattern to the lenticular pattern can be achieved by employing a chill roll that has been tooled on a modified electronic gravure engraver, such as those produced by Ohio Electronic Engraver (Dayton, Ohio), to produce the lenticular pattern of the lenticular-coated substrate in combination with printing from gravure print cylinders in which the gravure dot pattern has been engraved with line spacings identical to the chill roll lenticular pattern. Because electronic engraving allows a high degree of accuracy in matching the tooling accuracy for the chill roll and the print cylinders, exact registration of the print pattern to the lenticular pattern can be obtained. Because of the high registration accuracy obtainable by cutting all cylinders on the same machine with line spacings held constant relative to the accuracy of the electronics, it is not necessary to use low lens numbers for the lenticular pattern, e.g., 80 to 120 lpi, to allow for inexact registration. Furthermore, because gravure printing rather than lithographic or other conventional printing means are employed, printing at greater than 180 dots/in, preferably greater than about 200-500 dots/in is possible. The higher lens numbers and density of the gravure dot pattern obtainable with this process provides for a three-dimensional image superior quality; not only is the image of much higher resolution, moire patterns are eliminated and the colors reproduced more accurately. Further, because printing at a high dot density is possible, the thickness of the lenticular-coated substrate can be reduced while still allowing for a focused image. For instance, focused products can be produced using 16 mil lenticular-coated substrate and 180 lpi; 12.5 mil lenticular-coated substrate and 220 lpi; and 5 mil lenticular-coated substrate and 300 lpi.

Thus, this embodiment of the instant invention provides a process for producing a three-dimensional image which, in addition to the steps discussed above for producing the lenticular-coated substrate, calls for (A) cutting the lenticular pattern onto the chill roll with a precision gravure engraving machine such that the lenticular pattern comprises equally spaced lines; (B) color separating an image to produce a multiplicity of color-separated images; (C) for each color-separated image, engraving a gravure dot pattern with line spacings identical to the lenticular pattern onto a gravure print cylinder; and (D) printing the image onto the lower side of the substrate film. Alternatively, a paper substrate on which the image has been printed can be utilized with the tie and lenticular layers coextruded onto it. Additionally, the lenticular-coated substrate can be manufactured and then used to overlay the image that has been printed on either paper, opaque plastic, or clear plastic.

In addition, in printing for all other forms of packaging and printing beside the see through cartons, phantom pigments can be integrated into proprietary polymer combinations to make the material photosensitive under specific light conditions. Light sensitive inks can be added that can only be viewed under specific light sources.

In addition to the aforementioned aspects and embodiments of the present microlens for packaging and printing, the present invention further includes methods for manufacturing a microlens for packaging and printing.

Figure 16:
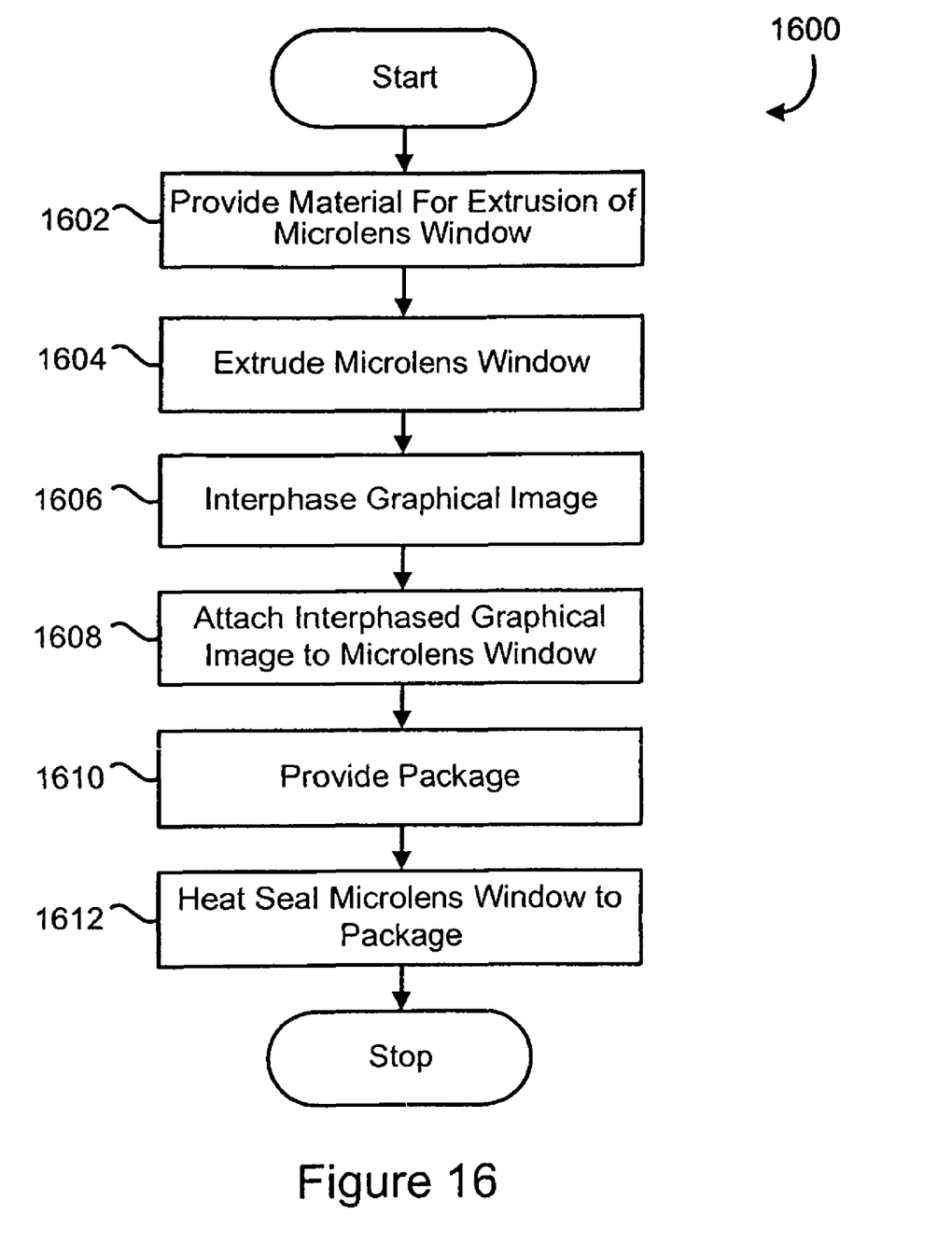
FIG. 16 illustrates a block flow diagram for the process for making a package with a microlens window according to an embodiment of the present invention.

FIG. 16 illustrates an embodiment 1600 of a block flow diagram of a method for making a package having a microlens window according to the present invention. In step 1602, a material suitable for extrusion is provided for forming the lenticular-coated substrate. In step 1604, the lenticular-coated substrate of the microlens window 104, 300, 600, 700, 800, and 900 is extruded. Preferably, the process comprises the steps of continuously advancing a plastic substrate film having an upper side and a lower side past an extrusion station; continuously coextruding a molten thermoplastic tie resin and a molten thermoplastic lenticular resin onto the upper side of the substrate film from the extrusion station to form a composite comprising a substrate layer, a tie layer and a lenticular layer such that the tie layer is superposed on the substrate film and the lenticular layer is superposed on the tie layer; and continuously advancing the composite past a chill roll to form the lenticular-coated substrate such that the lenticular layer of the composite contacts the chill roll to form a lenticular pattern.

According to a preferred embodiment of the present invention, the substrate film comprises an optically clear film, the tie resin comprises a clear adhesive polymer, the lenticular resin comprises a clear polymer, the thickness of the lenticular-coated substrate ranges from about 2.5 mils to about 20 mils, the ratio of the thickness of the substrate layer to the sum of the thickness of the tie layer and the thickness of the lenticular layer ranges from about 0.5:1 to about 1:1, and the ratio of the thickness of the lenticular layer to the thickness of the tie layer ranges from about 9:1 to about 4:1. General manufacturing steps for fabricating the lenticular-coated substrate are described in U.S. Pat. No. 5,362,351 issued 8 Nov. 1994 to Karszes and U.S. Pat. No. 6,060,003 issued 9 May 2000 to Karszes, which are incorporated herein by reference in their entirety.

In step 1606, the graphical images 212, 312, 608, and 710 are interphased by providing the lenticular-coated substrate having a plurality of microlenses or lenticules extending in a first direction with a spacing between lenticules and having an ink-receptive surface disposed on a surface of the lenticular sheet, and providing a digital image data processing apparatus having a data storage, a data input/output interface, and raster image processing ("RIP") software, and providing an inkjet printer having a print head moved in a carriage direction by a servo, a light sensor for receiving an ambient light passing through the lenticular sheet and for generating a sensor signal in response, and a transmitter for transmitting the sensor signal to the input/output interface of the digital image processing apparatus, and a servo for moving the sensor in the carriage direction.

Next, a digital image file representing, in pixel form, an image for printing on the lenticular sheet is stored in the image data storage of the digital image processing apparatus. The lenticular sheet is then fed or placed into the inkjet printer such that the lenticules extend in a direction perpendicular to the carriage direction. Next a scan step moves the light sensor in the carriage direction to detect light through the lenticular sheet at a sequence of positions along the carriage direction and transmits corresponding sensor data to the digital image processing apparatus. The digital image processing apparatus then calculates a lenticule spacing data, representing an estimated value of the lenticule spacing, based on the sensor data transmitted by the scan step. Next an image modification step generates a re-spaced digital image file based on the digital image file and the lenticule spacing data. A printing step then prints an image on the lenticular sheet corresponding to the re-spaced digital image file. General manufacturing steps for inter-phasing the lenticular-coated substrate are described in U.S. Pat. No. 6,709,080 issued 23 Mar. 2004 to Nims et al., U.S. Pat. No. 6,760,021 to Karszes et al., U.S. Pat. No. 6,781,707 issued 24 Aug. 2004 to Peters et al., U.S. Pat. No. 7,019,865 issued 28 Mar. 2006 to Nims et al., U.S. patent application Ser. No. 09/988,382 filed 19 Nov. 2001 to Nims et al., now abandoned, and U.S. patent application Ser. No. 10/025,835 filed 26 Dec. 2001 by Karszes et al., now abandoned, which are all incorporated herein by reference in their entirety.

In step 1608, the interphased graphical image 212, 312, 608, and 710 is attached to the microlens window 104, 300, 600, 700, 800, and 900. Preferably, inner surfaces 208, 308, 614, and 714 are treated for ink receptivity. The graphical images 212, 312, 608, and 710 are rendered into CYMK separations and printed onto the inner surfaces 208, 308, 614, and 714, respectively, of the microlens window 104, 300, 600, 700, 800, and 900 using conventional printing devices, such as roll lithography or flexography. A final clear varnish or UV hard coating is added to the back of the print to allow for food contact. General manufacturing steps for attaching the interphased graphical image to the microlens window 104, 300, 600, 700, 800, and 900 is further described in the references mentioned above.

In step 1610, a package 100 is provided to the system and in step 1612, the microlens window 104, 300, 600, 700, 800, and 900 is heat sealed to the package 100. In another embodiment, these steps are undertaken using system 1400 as described above.

Some examples of the present microlens for packaging and printing are provided below.

Example 1

An oriented polyester is primered with a material such as Primex™. A 206° C. heat sealable polyethylene is extrusion coated to a total thickness of 12 mils to create a microlens window. The cylindrical lens per image is package 100. A zooming image is created with 12 frames. The frames are interphased with 6 clear frames and 6 image frames. The image is reverse printed on the back of the material. White pigment is added behind the image area only. As a consumer walks by the carton, distinct motion due to the zooming effect is noted. The piece when viewed at an off angle shows the product behind the microlens window. Curiosity as to what the consumer is viewing will drive the consumer to investigate the effect. Standard marketing data shows that once a consumer picks up a product there is an 80% chance that the consumer will buy the product.

Example 2

The microlens window is made from the same material as in Example 1, but the lenticules are parabolic lenses with a shoulder. The total thickness of the microlens window is 5 mils.

Example 3

The microlens window as in either Example 2 or Example 3 is used with a three-dimensional in inter-dispersed with a motion (flip) segment.

Example 4

A multi-dimensional piece is designed with clear areas incorporated into the graphical images. Clear areas of different sizes as well as clear areas in a logo are incorporated so there is a discontinuous clear area in all portions of the microlens window. The graphical images are printed on the microlens window as described herein. The graphical image area in non-clear areas is composed of 12 frames. The white opacity area is printed behind all non-clear areas. This product is seen through the "designed in see-through areas." The advantage is that there exists less alignment in the printing of deeper richer images, thus providing an eye-catching motion and eye-retention three-dimensional images and clear see-through images dispersed through-out the packaging.

There has been described a microlens for packaging and printing. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, different types and numbers of microlens windows, materials for the microlens windows, and packages may be used without departing from the inventive concepts.

What is claimed:

1. A method for making a container comprising:
   providing a first heated conveyor having a first belt, the first belt including a plurality of heated shoes;
   providing a second conveyor having a second belt, the first belt and the second belt being substantially overlapping to provide a nip between at least one of the plurality of heated shoes and the second belt, the first and the second belts traveling in a common direction;
   placing a container on the second belt prior to the nip, the container having an opening disposed therethrough;
   placing a piece of lenticular material over the opening prior to reaching the nip; and
   bonding the piece of lenticular material to the opening in the nip with one of the plurality of heated shoes, while applying constant pressure to the container and lenticular opening.

2. The method of making a container of claim 1, wherein the placing the piece of lenticular material over the opening comprises:
   applying a hot melt to the perimeter of the opening prior to placing the piece of lenticular material on the opening.

3. The method of making a container of claim 1, wherein the placing a container on the second belt further comprises:
   placing a plurality of containers on the second belt in a continuous feed process.

4. The method of making a container of claim 1, wherein the placing a piece of lenticular material further comprises:
   cutting a continuous roll of lenticular material into the pieces of lenticular material.

5. The method of making a container of claim 1, wherein the bonding the piece of lenticular material over the opening comprises:
   sealing a microlens window into the opening of the container.

6. The method for making a container of claim 5, wherein sealing the microlens window further comprises:
   extruding a thermoplastic material to create a lenticular substrate having a plurality of lenticules.

7. The method for making a container of claim 6, wherein the providing the microlens window further comprises:
   interphasing at least one graphical image onto the microlens window to provide the interphased images interposed between the plurality of lenticules and the interior of the package.

8. The method for making a container of claim 6, wherein the providing the microlens window further comprises:
 coating a surface of the microlens window with a clear hard coating.

9. A method for making a package comprising:
 providing a first heated conveyor having a first belt, the first belt including a plurality of heated shoes, wherein the plurality of heated shoes are integrated into the belt;
 providing a second conveyor having a second belt, the first belt and the second belt being substantially overlapping to provide a nip between at least one of the plurality of heated shoes and the second belt, the first and the second belts traveling in a common direction;
 positioning a package on the second belt prior to the nip, the package having an opening disposed therethrough;
 disposing a microlens window over the opening of the package such that the microlens window substantially covers the entire opening of the package, the perimeter of the microlens window substantially overlapping the perimeter of the opening prior to reaching the nip; and
 sealing the piece of microlens window around the overlapping portions of the microlens window and the perimeter of the opening of the package with one of the plurality of heated shoes, while applying constant pressure to the container and microlens window.

10. The method of making a package of claim 9, wherein the placing the microlens window over the opening comprises:
 applying a hot melt to the perimeter of the opening prior to placing the microlens window to the overlapping portion of the opening of the window.

11. The method of making a package of claim 9, wherein the placing a container on the second belt further comprises:
 placing a plurality of containers on the second belt in a continuous feed process.

12. The method of making a package of claim 9, wherein the placing a microlens window further comprises:
 cutting a continuous roll of microlens material into individual microlens windows.

13. The method for making a package of claim 9, wherein sealing the piece of microlens window further comprises:
 extruding a thermoplastic material to create a lenticular substrate having a plurality of lenticules.

14. The method for making a package of claim 9, wherein the disposing a microlens window over the opening of the package further comprises:
 interphasing at least one graphical image onto the microlens window to provide the interphased images interposed between the plurality of lenticules and the interior of the package.

15. The method for making a package of claim 14, wherein the disposing a microlens window over the opening of the package further comprises:
 coating a surface of the microlens window with a clear hard coating.

16. The method for making a package of claim 14, wherein the sealing comprises:
 sealing the microlens window to the container with heat.

17. The method for making a package of claim 9, wherein the microlens window comprises a material is selected from the group consisting of biaxial oriented polyester, biaxial oriented polyethylene terephthalate (OPET), amorphous polyester (APET), and clear stable plastic films.

18. The method for making a package of claim 14, wherein the at least one graphical image comprises:
 an outer surface that seals with the package and an inner surface that contacts the contents within the package, wherein the at least one graphical image is printed on the inner surface.

19. The method for making a package of claim 14, wherein the microlens window further comprises:
 at least one see-through window located on the outer surface for enabling viewing of the contents through the see-through window.

20. The method of claim 9, wherein each of the plurality of heated shoes has an outer perimeter and a cavity within the outer perimeter.

21. The method of claim 1, wherein each of the plurality of heated shoes has an outer perimeter and a cavity within the outer perimeter and the outer perimeter applies pressure to an outside perimeter of the opening.

22. The method of claim 21, wherein the constant pressure applied to the container and lenticular opening is provided for the entirety of the nip.

23. The method of claim 1, wherein the plurality of heated shoes make up only a portion of the belt and only the plurality of heated shoes of the belt are heated.

* * * * *